US008823586B2

(12) United States Patent
Malkos et al.

(10) Patent No.: US 8,823,586 B2
(45) Date of Patent: Sep. 2, 2014

(54) METHOD AND SYSTEM FOR GNSS ASSISTANCE DATA OR LTO DATA DOWNLOAD OVER A BROADCAST BAND

(75) Inventors: Steven Malkos, San Jose, CA (US); Christopher Lane, Ridgewood, NJ (US)

(73) Assignee: Broadcom Corporation, Irvine, CA (US)

( * ) Notice: Subject to any disclaimer, the term of this patent is extended or adjusted under 35 U.S.C. 154(b) by 839 days.

(21) Appl. No.: 12/394,152

(22) Filed: Feb. 27, 2009

(65) Prior Publication Data
US 2010/0220004 A1 Sep. 2, 2010

(51) Int. Cl.
*G01S 19/05* (2010.01)

(52) U.S. Cl.
USPC ..................................................... 342/357.42

(58) Field of Classification Search
USPC ........................................ 342/357.15, 357.42
See application file for complete search history.

(56) References Cited

U.S. PATENT DOCUMENTS

| 6,018,313 | A | 1/2000 | Engelmayer et al. |
| 6,788,251 | B2 * | 9/2004 | Townsend et al. ............. 342/384 |
| 6,829,535 | B2 * | 12/2004 | van Diggelen et al. ........ 701/213 |
| 7,427,951 | B2 * | 9/2008 | Kuo et al. ................... 342/357.15 |
| 7,495,609 | B1 * | 2/2009 | Woo et al. ................... 342/357.09 |
| 2008/0284646 | A1 | 11/2008 | Walley et al. |

FOREIGN PATENT DOCUMENTS

| DE | 19640735 A1 | 4/1998 |
| EP | 1720030 A1 | 8/2006 |
| GB | 2307812 A | 4/1997 |
| WO | WO03010912 | 2/2003 |

OTHER PUBLICATIONS

EPO Communication dated Jun. 8, 2010.
EPO Communication dated Jun. 27, 2011 in Application No. 10001531.2-1248 (5 pages).

* cited by examiner

*Primary Examiner* — Cassie Galt
(74) *Attorney, Agent, or Firm* — Sterne, Kessler, Goldstein & Fox P.L.L.C.

(57) ABSTRACT

A combined GNSS and FM receiver receives FM signals comprising satellite navigation data from an AGNSS server. Associated navigation information such as a position fix is determined based on the received satellite navigation data. The received satellite navigation data are GNSS assistance data or LTO data. The AGNSS server generates the satellite navigation data by acquiring GNSS data from a satellite reference network. The acquired GNSS data comprise, for example, GPS data, GLONASS data and/or GALILEO data. The generated satellite navigation data are broadcasted as FM signals through RDS and/or RBDS to the combined GNSS and FM receiver. The combined GNSS and FM receiver receives updated satellite navigation data in subsequent FM signals, periodically or aperiodically, and updates associated navigation information, accordingly. The combined GNSS and FM receiver decodes the received FM radio signals for the updated satellite navigation data generated at the AGNSS server before being transmitted.

20 Claims, 4 Drawing Sheets

METHOD AND SYSTEM FOR GNSS ASSISTANCE DATA OR LTO DATA DOWNLOAD OVER A BROADCAST BAND

CROSS-REFERENCE TO RELATED APPLICATIONS/INCORPORATION BY REFERENCE

Not applicable

FIELD OF THE INVENTION

Certain embodiments of the invention relate to signal processing for satellite navigation systems. More specifically, certain embodiments of the invention relate to a method and system for GNSS assistance data or LTO data download over a broadcast band.

BACKGROUND OF THE INVENTION

The market for Location-Based Services (LBS) is potentially tremendous. Location-Based Services may comprise services where information about the location of users or assets may be required. One of state-of-the art technology driving the LBS market today is assisted global navigation satellite systems (AGNSS). This technology combines satellite positioning and communication networks such as mobile networks to reach performance levels allowing the wide deployment of Location-Based Services. AGNSS uses assistance data provided from an AGNSS server via, for example, a mobile telephony network, to speed up the process of acquiring a position fix especially in a weak signal environment. The AGNSS server has access to a reference network of GNSS receivers that are placed in ideal locations (direct line-of-sight to satellites). The GNSS receivers comprise Global Positioning System (GPS) receivers, the Global Orbiting Navigation Satellite System (GLONASS) receivers, and/or the GALILEO system receivers. The reference network may be used as a source for providing the assistance data. Depending on the AGNSS server and GNSS receiver capabilities, the assistance data may comprise various elements such as ephemeris data. The ephemeris data may be valid only for the visibility period of each detected satellite such as a GPS satellite, which may be approximately 4 hours assuming that the receiver is static and the GPS satellite is just rising above the horizon.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for GNSS assistance data or LTO data download over a broadcast band, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for GNSS assistance data or LTO data download over a FM broadcast band. Various aspects of the invention may enable a combined GNSS and FM receiver to receive FM signals over FM bands, wherein the received FM signals may comprise satellite navigation data from an AGNSS server. The combined GNSS and FM receiver may be enabled to determine associated navigation information such as a position fix based on the received satellite navigation data. The satellite navigation data may comprise assistance data such as GNSS assistance data or LTO data from the AGNSS server. The AGNSS server may be configured to provide the satellite navigation data by acquiring valid GNSS data collected by a satellite reference network. The acquired valid GNSS data may comprise GPS data, GLONASS data and/or GALILEO data. The AGNSS server may communicate the acquired satellite navigation data to a FM broadcast network associated with the FM radio station. The FM radio station may be enabled to embed the acquired satellite navigation data in FM signals and broadcast to the combined GNSS and FM receiver through radio data system (RDS) and/or radio broadcast data system (RBDS). The combined GNSS and FM receiver may receive the broadcasted satellite navigation data through the received FM signals.

In order to provide valid satellite navigation data, the AGNSS server may be configured to update the satellite navigation data periodically or aperiodically, based on acquired up-to-date GNSS data from the satellite reference network. The updated satellite navigation data may be subsequently broadcasted in the FM signals to the combined GNSS and FM receiver via the FM radio station. The combined GNSS and FM receiver may be enabled to receive the updated satellite navigation data through the received FM signals. The combined GNSS and FM receiver may be enabled to update associated navigation information such as a position fix based on the received updated satellite navigation data embedded in the FM signals from the FM radio station. The AGNSS server may be configured to provide the updated satellite navigation data through the FM signals from the FM radio station periodically or aperiodically. The combined GNSS and FM receiver may be enabled to determine subsequent associated navigation information based on the received FM radio signals comprising the updated satellite navigation data provided by the AGNSS server. The combined GNSS and FM receiver may be enabled to decode the received FM radio signals using RDS and/or RBDS audio data format for the updated satellite navigation data. The satellite navigation data may be generated at the AGNSS server before being transmitted to the combined GNSS and FM receiver as the FM signals via the FM radio station.

Figure 1:
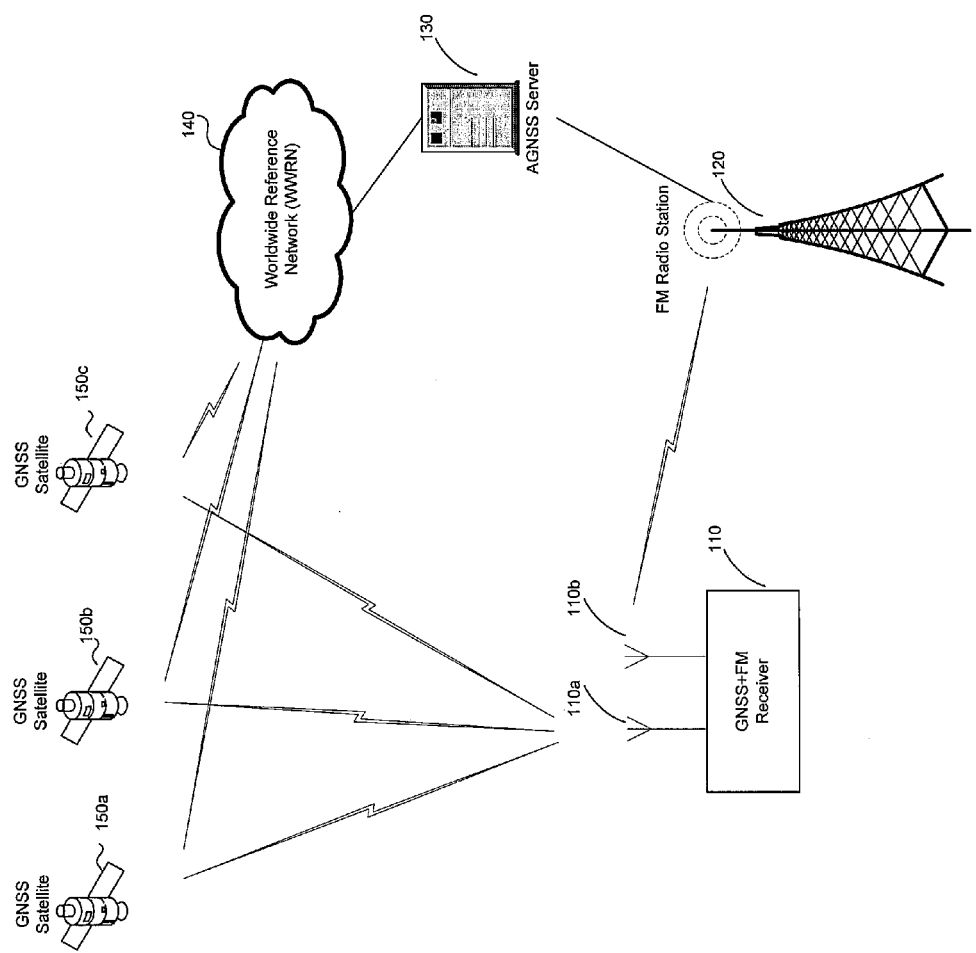
FIG. 1 is a diagram illustrating an exemplary assistance GNSS satellite navigation system that enables GNSS assistance data or LTO data download over a FM broadcast band, in accordance with an embodiment of the invention.

FIG. 1 is a diagram illustrating an exemplary assistance GNSS satellite navigation system that enables GNSS assistance data or LTO data download over a FM broadcast band, in accordance with an embodiment of the invention. Referring to FIG. 1, there is shown an assistance GNSS (AGNSS) satellite navigation system 100, comprising a GNSS antenna 110a, a FM antenna 110b, a combined GNSS and FM receiver 110, a FM radio station 120, an AGNSS server 130, a Worldwide Reference Network (WWRN) 140, and a plurality of GNSS satellites, of which GNSS satellites 150a, 150b, and 150c are illustrated.

The GNSS antenna 110a may comprise suitable logic, circuitry and/or code that may be enabled to receive GNSS signals from a plurality of GNSS satellites such as the GNSS 150a through 150c. The GNSS antenna 110a may be coupled with the GNSS and FM receiver 110 and communicate the received GNSS signals to the combined GNSS and FM receiver 110 to be processed for corresponding navigation information.

The FM antenna 110b may comprise suitable logic, circuitry and/or code that may be enabled to receive FM signals over FM broadcast bands from a plurality of FM radio stations such as the FM radio station 120. In this regard, the received FM signal may comprise GNSS assistance data or LTO data from the AGNSS server 130. The FM antenna 110b may be coupled with the GNSS and FM receiver 110 and may communicate the received FM signals to the combined GNSS and FM receiver 110 to be processed for corresponding GNSS assistance data or LTO data.

Although two separate antenna 110a and 110b are illustrated, the invention may not be so limited. Accordingly, a single antenna may be utilized to receive both GNSS signals and FM signals by the combined GNSS and FM receiver 110 without departing from the spirit and scope of various embodiments of the invention.

The combined GNSS and FM receiver 110 may comprise suitable logic, circuitry, interface(s) and/or code that may be enabled to receive signals broadcasted from both GNSS satellites and/or the FM radio station 120. Exemplary satellites may comprise GPS, GLONASS and GALILEO. The combined GNSS and FM receiver 110 may be enabled to receive satellite transmission signals from the GNSS satellites 150a through 150c to determine the position of the combined GNSS and FM receiver 110. The combined GNSS and FM receiver 110 may be enabled to receive FM transmission signals from the FM radio station 120. In the event that the FM radio station 120 may be enabled to broadcast radio data service (RDS) which allows the FM station 120 to transmit additional types of information via standard FM radio signals. The combined GNSS and FM receiver 110 may be equipped with a RDS tuner to receive and decode the RDS from the FM radio station 120. In this regard, the received RDS may comprise GNSS assistance data or LTO data, the combined GNSS and FM receiver 110 may be enabled to decode the GNSS assistance data or LTO data from the received RDS. Moreover, the combined GNSS and FM receiver 110 may be operable to associate its initial position with corresponding broadcasting towers such as the FM radio station 120 for a fast position fix. In one embodiment of the invention, the combined GNSS and FM receiver 110 may be integrated within a single chip or integrated circuit.

The FM radio station 120 may comprise suitable logic, circuitry and/or code that may be allocated a single carrier frequency to broadcast a small subcarrier signal by applying a FM modulation centered at the single carrier frequency. The FM radio station 120 may enable communication of content, comprising FM audio, and/or FM data to FM-enabled devices such as the combined GNSS and FM receiver 110. In this regard, the FM radio station 120 may be enabled to acquire GNSS assistance data or LTO data from the AGNSS server 130. The FM radio station 120 may be operable to broadcast acquired GNSS assistance data or LTO data over a FM band using standard RDS audio file data formats.

The AGNSS server 130 may comprise suitable logic, circuitry, interface(s) and/or code that may have access to a GNSS reference network such as, for example, the WWRN 140, to collect GNSS satellite data by tracking GNSS constellations through the WWRN 140. The AGNSS server 130 may be enabled to generate AGNSS assistance data and communicate with broadcast networks such as a FM broadcast network. The generated up-to-date AGNSS assistance data may be broadcasted to users such as the combined GNSS and FM receiver 110 via the FM radio station 120 to compute its location. The AGNSS server 140 may support messaging in exemplary formats such as the standard RDS audio file data formats that may be compatible with broadcast networks such as a FM broadcast network and variants thereof. In addition, the AGNSS server 140 may be enabled to use Long Term Orbits (LTO) technology to provide accurate AGNSS assistance data for healthy GNSS satellites, which may be valid for up to 30 days, for instance, in the future. This may enable the benefits of AGNSS technology to be realized by the combined GNSS and FM receiver 110 when the combined GNSS and FM receiver 110 may temporarily be out of range of FM broadcast networks.

The WWRN 150 may comprise suitable logic, circuitry and/or code that may be enabled to collect and distribute data for GNSS satellites such as 150a through 150c on a continuous basis. The WWRN 140 may comprise a plurality of GNSS reference receivers located around the world to provide AGNSS coverage all the time in both home network and visited network. The WWRN 140 may enable users of GNSS enabled devices such as the combined GNSS and FM receiver 110 to roam with their up-to-date location information anywhere in the world. The WWRN 150 may ensure high levels of availability, reliability, and performance.

The GNSS satellites 150a through 150c may comprise suitable logic, circuitry and/or code that may be enabled to generate and broadcast suitable radio-frequency (RF) signals. The broadcast RF signals may be received by a GNSS satellite receiver integrated in the combined GNSS and FM receiver 110. The received broadcast RF signals may be utilized to determine navigation information comprising, for example, position, velocity, and clock information of the combined GNSS and FM receiver 110. The GNSS satellites 150a through 150c may comprise various navigation satellite systems such as, for example, Global Positioning System (GPS) satellites, Global Orbiting Navigation Satellite System (GLONASS) satellites, and/or satellite navigation system GALILEO satellites.

In operation, the combined GNSS and FM receiver 110 may be operable to receive GNSS signals via the GNSS antenna 110a from the GNSS satellites 150a through 150c and FM signals via the FM antenna 110b from the FM radio station 120, respectively. The FM radio station 120 may transmit the FM signals as RDS data. In this regard, the FM radio station 120 may acquire GNSS assistance data or LTO data from the AGNSS server 130. The FM radio station 120 may transmit the acquired GNSS assistance data or LTO data over FM band as RDS to various FM-capable devices such as the combined GNSS and FM receiver 110. The combined GNSS and FM receiver 110 may be enabled to decode the GNSS assistance data or LTO data from the received RDS to be used for calculating a navigation solution such as the position of the combined GNSS and FM receiver 110. Moreover, information such as associated towers of the FM radio station 120 may be used as initial positions of the combined GNSS and FM receiver 110 for a fast position fix.

The AGNSS server 130 may be operable to generate GNSS assistance data or LTO data based on GNSS data collected through the WWRN 140. The generated GNSS assistance data or LTO data may be in exemplary formats such as the standard RDS audio file data formats. In the event that LTO technology may be enabled at the AGNSS server 130, the AGNSS server 130 may provide the FM radio station 120 with LTO data. The FM radio station 120 may be operable to transmit the LTO data as RDS data over FM band to various FM-capable devices such as the combined GNSS and FM receiver 110, accordingly. The combined GNSS and FM receiver 110 may use the received LTO data to calculate a position fix even when it may be temporarily out of FM broadcast network range.

Figure 2:
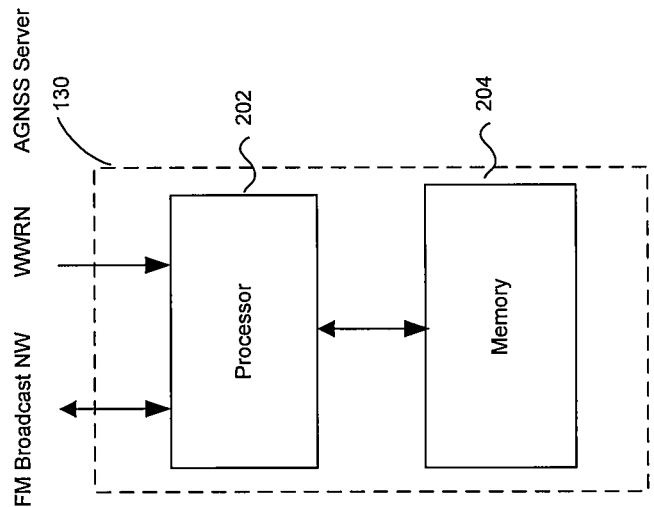
FIG. 2 is a diagram illustrating an exemplary AGNSS server that enables GNSS assistance data or LTO data download over a FM broadcast band, in accordance with an embodiment of the invention.

FIG. 2 is a diagram illustrating an exemplary AGNSS server that enables GNSS assistance data or LTO data download over a FM broadcast band, in accordance with an embodiment of the invention. Referring to FIG. 2, there is shown an AGNSS server 130 comprising a processor 202 and memory 204.

The processor 202 of the AGNSS server 130 may comprise suitable logic, circuitry, interface(s) and/or code that may be enabled to generate GNSS assistance data based on GNSS satellite data collected from a GNSS reference network such as, for example, the WWRN 140. The processor 202 may be enabled to communicate the generated GNSS assistance data with, for example, broadcast networks such as a FM broadcast network to provide the generated GNSS assistance data via the FM radio station 120 to various user terminals such as the combined GNSS and FM receiver 110. The processor 202 may support messaging in various exemplary formats such as the standard RDS audio file data formats that may be compatible with broadcast networks such as a FM broadcast network and variants thereof. In the event that the LTO technology may be enabled, the processor 202 may be operable to provide LTO data to the FM broadcast network and transmit to user terminals such as the combined GNSS and FM receiver 110 via the FM radio station 120.

The memory 204 may comprise suitable logic, circuitry, interface(s) and/or code that enable storing information such as executable instructions and data that may be utilized by the processor 202. The executable instructions may comprise algorithms that may be enabled to calculate GNSS assistance data or LTO data using acquired satellite data from the WWRN 150 automatically or upon request/signaled. The data may comprise various calculated GNSS assistance data or LTO data. The memory 204 may comprise RAM, ROM, low latency nonvolatile memory such as flash memory and/or other suitable electronic data storage.

In operation, the AGNSS server 130 may be enabled to provide GNSS assistance data or LTO data to various GNSS-capable terminals such as the combined GNSS and FM receiver 110. The processor 202 may be operable to generate GNSS assistance data or LTO data using various algorithms stored in the memory 204. The processor 202 may be configured to format the generated GNSS assistance data or LTO data in various exemplary formats compatible with broadcasting networks such as a FM broadcast network. For example, the generated GNSS assistance data or LTO data may be formatted in the standard RDS audio file data formats. The processor 202 may communicate the generated GNSS assistance data or LTO data with the FM broadcast network to provide the generated GNSS assistance data or LTO data to GNSS-capable terminals such as the combined GNSS and FM receiver 110 via the FM radio station 120 as RDS, accordingly.

Figure 3:
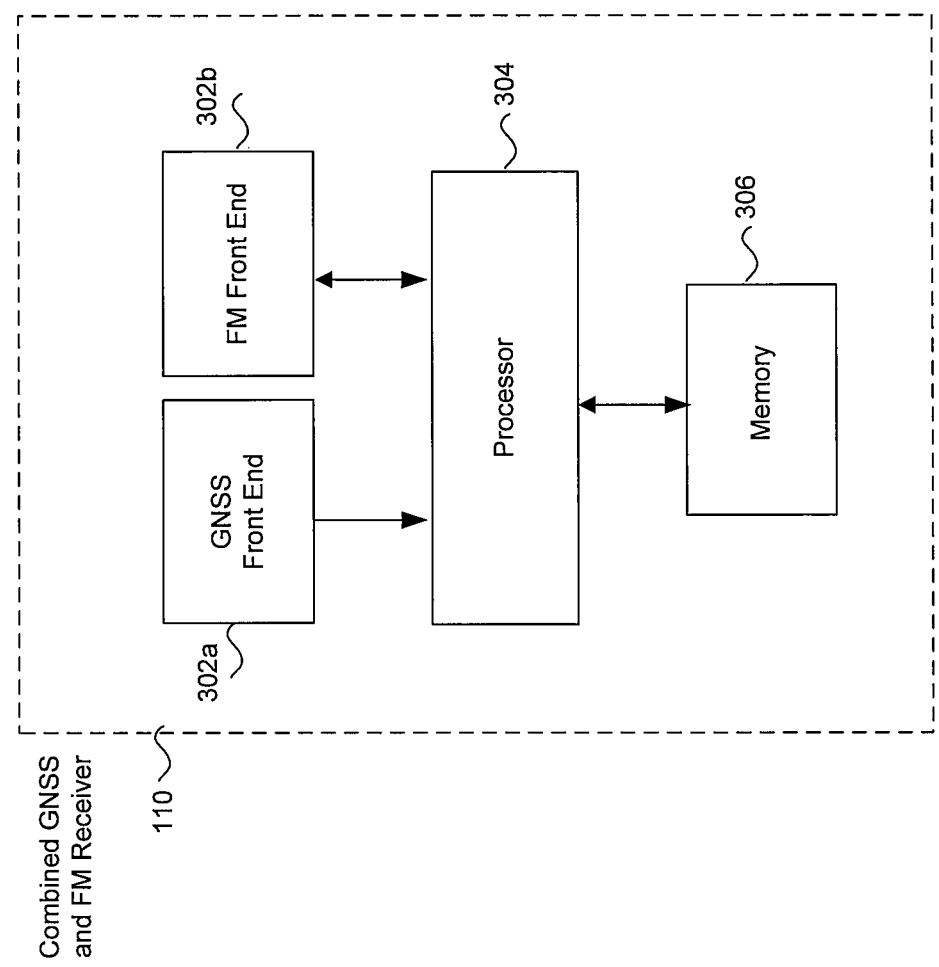
FIG. 3 is a diagram illustrating an exemplary combined GNSS and FM receiver that may be enabled to receive GNSS assistance data or LTO data over a FM broadcast band, in accordance with an embodiment of the invention.

FIG. 3 is a diagram illustrating an exemplary combined GNSS and FM receiver that may be enabled to receive GNSS assistance data or LTO data over a FM broadcast band, in accordance with an embodiment of the invention. Referring to FIG. 3, there is shown a combined GNSS and FM receiver 110 comprising a GNSS front end 302a, a FM front end 302b, a processor 304, and a memory 306.

The GNSS front end 302a may comprise suitable logic, circuitry, interface(s) and/or code that may be enabled to receive and process GNSS signals via the GNSS antenna 110a. The GNSS front end 302a may be operable to convert the received GNSS signals to GNSS baseband signals, which may be suitable for further processing in the processor 304 for a navigation solution, whether GNSS based or AGNSS based.

The FM front end 302b may comprise suitable logic, circuitry, interface(s) and/or code that may be enabled to receive and process FM signals over a FM band via the FM antenna 110b. The FM front end 302b may be operable to convert the received FM signals to corresponding FM baseband signals, which may be suitable for further processing in the processor 304. In this regard, the received FM signals may comprise GNSS assistance data generated from the AGNSS server 130. In instances where LTO technology may be enabled at the AGNSS server 130, the received FM signals may comprise LTO.

The processor 304 may comprise suitable logic, circuitry, interface(s) and/or code that may be enabled to process received GNSS signals as well as FM signals received from a FM broadcast network. The processor 304 may be configured to extract navigational information from each received GNSS signal to compute a position fix for the combined GNSS and FM receiver 110. The processor 304 may be programmed to calculate the position fix by combining received GNSS data and received GNSS assistance data from the AGNSS server 130. When LTO data may be available from the AGNSS server 130, the processor 304 may be enabled to calculate a position fix for the combined GNSS and FM receiver 110 based on the received GNSS signals and the LTO data even when the combined GNSS and FM receiver 110 may temporally out of the FM broadcast network range. In addition, information such as FM channel used for receiving the GNSS assistance data or LTO data may associate a corresponding initial position of the combined GNSS and FM receiver for determining a fast position fix.

The memory 306 may comprise suitable logic, circuitry, interface(s) and/or code that may enable storing of information such as executable instructions and data that may be utilized by the processor 304. The executable instructions may comprise algorithms that may be applied to calculate a position fix using the received GNSS signals and the GNSS assistance data or LTO data from the AGNSS server 130. The data may comprise the received GNSS signals and the received GNSS assistance data or LTO data. Broadcast network information such as mappings between radio stations and corresponding broadcast carrier frequencies (channels) may be stored inside memory 306 to be used to associate initial position of the combined GNSS and FM receiver 110 with those towers for a fast position fix. The memory 306 may comprise RAM, ROM, low latency nonvolatile memory such as flash memory and/or other suitable electronic data storage.

In operation, GNSS signals and FM signals may be received by the combined GNSS and FM receiver 110 via the GNSS antenna 110a and/or the FM antenna 110b, respectively. The received GNSS signals and the received FM signals may be communicated to the GNSS front end 302a and/or the FM front end 302b, respectively. The GNSS front end 302a may convert the received GNSS signals into corresponding GNSS baseband signals, which are communicated to the processor 304. The FM front end 302b may convert the received FM signals into corresponding FM baseband signals, which are communicated to the processor 304. The received FM signals may comprise GNSS assistance data or LTO data from the AGNSS server 130. The received GNSS assistance data or LTO data may be stored in the memory 306. In instances where the user of the combined GNSS and FM receiver 110 may need to calculate its position fix, the processor 304 may calculate a position fix for the combined GNSS and FM receiver 110 based on the GNSS assistance data or LTO data stored in the memory 306, and the received GNSS signals from the GNSS front end 302a, respectively. Moreover, the processor 304 may be enabled to associate initial position of the combined GNSS and FM receiver 110 with towers of the FM radio station 120 for a fast position fix.

Figure 4:
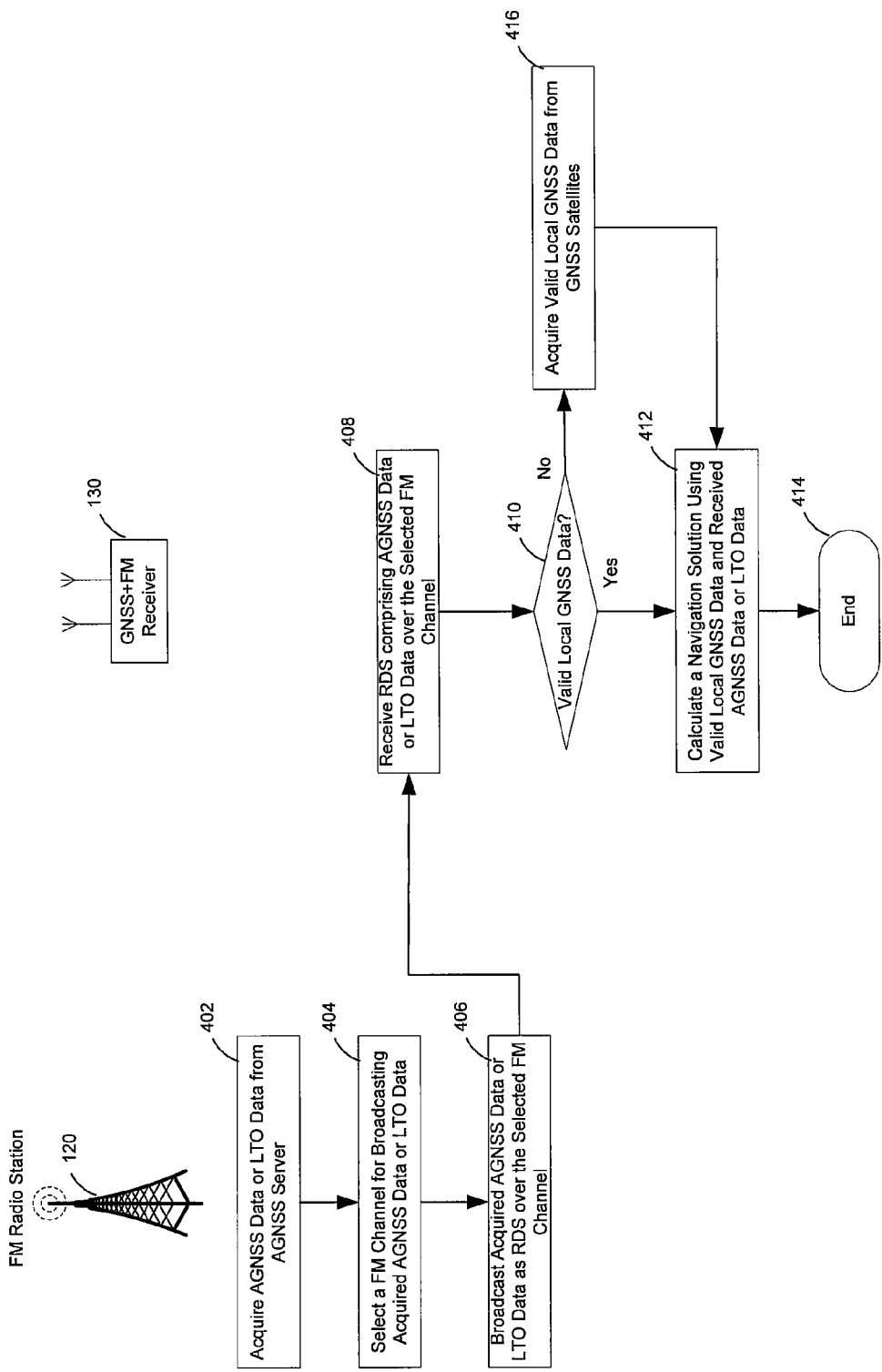
FIG. 4 is a flow chart illustrating exemplary steps for communicating GNSS assistance data or LTO data download over a FM broadcast band, in accordance with an embodiment of the invention.

FIG. 4 is a flow chart illustrating exemplary steps for communicating GNSS assistance data or LTO data download over a FM broadcast band, in accordance with an embodiment of the invention. Referring to FIG. 4, where the exemplary steps start with the step 402, where the FM radio station 120 may acquire GNSS assistance data or LTO data from the AGNSS server 130. In step 404, the FM radio station 120 may select a FM channel for broadcasting the acquired GNSS assistance data or LTO data. In step 406, the FM radio station 120 may broadcast the acquired GNSS assistance data or LTO data over the selected FM channel. In step 408, the combined GNSS and FM receiver 120 may tune to the selected FM channel to receive the broadcasted RDS from the FM radio station.

In step 410, the combined GNSS and FM receiver 120 may determine if valid local GNSS data exists, wherein the local GNSS data may be associated with GNSS signals acquired via the GNSS antenna 110a from the GNSS satellites 150a through 150c, respectively. In instances where the valid local GNSS data exists, then in step 412, the processor 302 may be enabled to calculate a navigation solution such as a position fix using the valid local GNSS data and the received GNSS assistance data or LTO data via the FM radio station 120. The processor 302 may be operable to associate its initial position with corresponding FM channel of the received GNSS assistance data or LTO data for a fast position fix, for example. The exemplary steps may end at step 414. In step 410, in instances where the valid local GNSS data does not exist, then in step 416, the combined GNSS and FM receiver 110 may activate the GNSS front end 302 to acquire GNSS signals via the GNSS antenna 110a for valid local GNSS data. The exemplary steps may continue in step 412.

Aspects of a method and system for AGNSS assistance data or LTO data download over a FM broadcast band are provided. In accordance with various embodiments of the invention, the combined GNSS and FM receiver 110 may be enabled to receive a plurality of GNSS signals and a plurality of FM signals. The plurality of GNSS signals may be acquired from a plurality of GNSS satellites such as the GNSS satellites 150a through 150c. The plurality of FM signals may be received over FM bands from FM radio stations such as the FM radio station 120. The plurality of FM signals may comprise assistance data from the AGNSS server 130. The assistance data may be GNSS assistance data or LTO data generated at the AGNSS server 130. The AGNSS server 130 may generate the GNSS assistance data or LTO data in a format compatible with RDS audio data format. The AGNSS server 130 may communicate the generated GNSS assistance data or LTO data with a FM broadcast network associated with the FM radio station 120. The FM broadcast network may be enabled to embed the generated GNSS assistance data or LTO data in the plurality of FM signals and broadcast to the combined GNSS and FM receiver 110 via the FM radio station 120. The FM radio station 120 may broadcast the generated GNSS assistance data or LTO data periodically or aperiodically depending on configuration of the FM radio station 120.

The combined GNSS and FM receiver 110 may be enabled to decode the broadcasted GNSS assistance data or LTO data from the received plurality of FM signals using RDS audio data format. The combined GNSS and FM receiver 110 may be operable to calculate a navigation solution such as a position fix of the combined GNSS and FM receiver 110 based on the received plurality of GNSS signals from the GNSS satellites 150a through 150c and the decoded GNSS assistance data or LTO data. In instances where LTO data may be used, the combined GNSS and FM receiver 110 may be enabled to calculate the navigation solution without the assistance of the FM broadcast network. For example, in instances where the combined GNSS and FM receiver 110 may be temporally out of the range of the FM broadcast network, the decoded LTO data at the combined GNSS and FM receiver 110 may be still valid.

The combined GNSS and FM receiver 110 may be operable to calculate the navigation solution using the received plurality of GNSS signals from the GNSS satellites 150a through 150c with assistance of the valid LTO data. Depending on FM bands used for transmitting the GNSS assistance data or LTO data to the combined GNSS and FM receiver 110. The combined GNSS and FM receiver 110 may be enabled to determine its initial positions by utilizing information such as, for example, an FM transmitter for the FM radio station 120, associated with the FM network. The combined GNSS and FM receiver 110 may calculate the navigation solution using the determined initial positions for a fast position fix.

In accordance with various embodiments of the invention, the combined GNSS and FM receiver 110 may be enabled to receive FM signals over FM bands from FM radio stations such as the FM radio station 120, wherein the received FM signals may comprise satellite navigation data from the AGNSS server 130. The combined GNSS and FM receiver 110 may be enabled to determine associated navigation information such as a position fix based on the received satellite navigation data. The satellite navigation data may comprise assistance data such as GNSS assistance data or LTO data from the AGNSS server 130. The AGNSS server 130 may be configured to provide the satellite navigation data by acquiring valid GNSS data collected by the WWRN 140. The acquired valid GNSS data may comprise various navigation satellite data such as, for example, GPS data, GLONASS data and/or GALILEO data. The AGNSS server 130 may communicate the acquired satellite navigation data to a FM broadcast network associated with the FM radio station 120.

The FM radio station 120 may be enabled to embed the acquired satellite navigation data in FM signals and broadcast to the combined GNSS and FM receiver 110 through radio data system (RDS) and/or radio broadcast data system (RBDS). The combined GNSS and FM receiver 110 may receive the broadcasted satellite navigation data through the received FM signals via the FM front-end 302b. In order to provide valid satellite navigation data, the AGNSS server 130 may be configured to update the satellite navigation data periodically based on acquired up-to-date GNSS data from the WWRN 140. The updated satellite navigation data may be broadcasted subsequently in the FM signals to the combined GNSS and FM receiver 110 via the FM radio station 120. The combined GNSS and FM receiver 110 may be enabled to receive the updated satellite navigation data through the received FM signals via the FM front-end 302b.

The combined GNSS and FM receiver 110 may be enabled to update associated navigation information such as a position fix based on the received updated satellite navigation data embedded in the FM signals from the FM radio station 120. The AGNSS server 130 may be configured to provide the updated satellite navigation data through the FM signals from the FM radio station 120 periodically or aperiodically. The combined GNSS and FM receiver 110 may be enabled to determine subsequent associated navigation information based on the received FM radio signals comprising the updated satellite navigation data provided by the AGNSS server 130. The combined GNSS and FM receiver 110 may be enabled to decode the received FM radio signals using RDS and/or RBDS audio data format for the updated satellite navigation data. The satellite navigation data may be generated at the AGNSS server 130 before being transmitted to the combined GNSS and FM receiver 110 as the FM radio signals via the FM radio station 120.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for GNSS assistance data or LTO data download over a FM broadcast band.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising: receiving, from an FM radio base station, broadcast FM radio signals comprising satellite navigation data, wherein said satellite navigation data is acquired by said FM radio base station from an assisted global navigation satellite systems (AGNSS) server; and determining navigation information based on said satellite navigation data received via said broadcast FM radio signals, wherein said satellite navigation data received via said broadcast FM radio signals comprise assisted GNSS data and long term orbit (LTO) data.

2. A method for processing signals, the method comprising: receiving, from an FM radio base station, broadcast FM radio signals comprising satellite navigation data, wherein said satellite navigation data is acquired by said FM radio base station from an assisted global navigation satellite systems (AGNSS) server; and determining navigation information based on said satellite navigation data received via said broadcast FM radio signals, wherein said satellite navigation data comprise GPS data, GLONASS data and/or GALILEO data.

3. The method according to claim 1, further comprising receiving said satellite navigation data via said broadcast FM radio signals through one of a radio data system (RDS) or a radio broadcast data system (RBDS).

4. The method according to claim 1, further comprising receiving updated satellite navigation data via subsequently received broadcast FM radio signals.

5. The method according to claim 4, further comprising updating said navigation information based on said received updated satellite navigation data.

6. The method according to claim 4, wherein said updating of said navigation information occurs periodically or aperiodically.

7. A method for processing signals, the method comprising: receiving, from an FM radio base station, broadcast FM radio signals comprising satellite navigation data, wherein said satellite navigation data is acquired by said FM radio base station from an assisted global navigation satellite systems (AGNSS) server; and determining navigation information based on said satellite navigation data received via said broadcast FM radio signals, comprising determining subsequent navigation information based on said received broadcast FM radio signals comprising said satellite navigation data.

8. The method according to claim 1, further comprising decoding said received broadcast FM radio signals comprising satellite navigation data.

9. The method according to claim 1, wherein said satellite navigation data is generated by said AGNSS server prior to being transmitted as said broadcast FM radio signals.

10. The method according to claim 2, further comprising receiving said satellite navigation data via said broadcast FM radio signals through one of a radio data system (RDS) or a radio broadcast data system (RBDS).

11. The method according to claim 2, further comprising receiving updated satellite navigation data via subsequently received broadcast FM radio signals.

12. The method according to claim 11, further comprising updating said navigation information based on said received updated satellite navigation data.

13. The method according to claim 11, wherein said updating of said navigation information occurs periodically or aperiodically.

14. The method according to claim 2, further comprising decoding said received broadcast FM radio signals comprising satellite navigation data.

15. The method according to claim 2, wherein said satellite navigation data is generated by said AGNSS server prior to being transmitted as said broadcast FM radio signals.

16. The method according to claim 7, further comprising receiving said satellite navigation data via said broadcast FM radio signals through one of a radio data system (RDS) or a radio broadcast data system (RBDS).

17. The method according to claim 7, further comprising receiving updated satellite navigation data via subsequently received broadcast FM radio signals.

18. The method according to claim 17, further comprising updating said navigation information based on said received updated satellite navigation data.

19. The method according to claim 7, further comprising decoding said received broadcast FM radio signals comprising satellite navigation data.

20. The method according to claim 7, wherein said satellite navigation data is generated by said AGNSS server prior to being transmitted as said broadcast FM radio signals.

\* \* \* \* \*